United States Patent Office 2,811,972
Patented Nov. 5, 1957

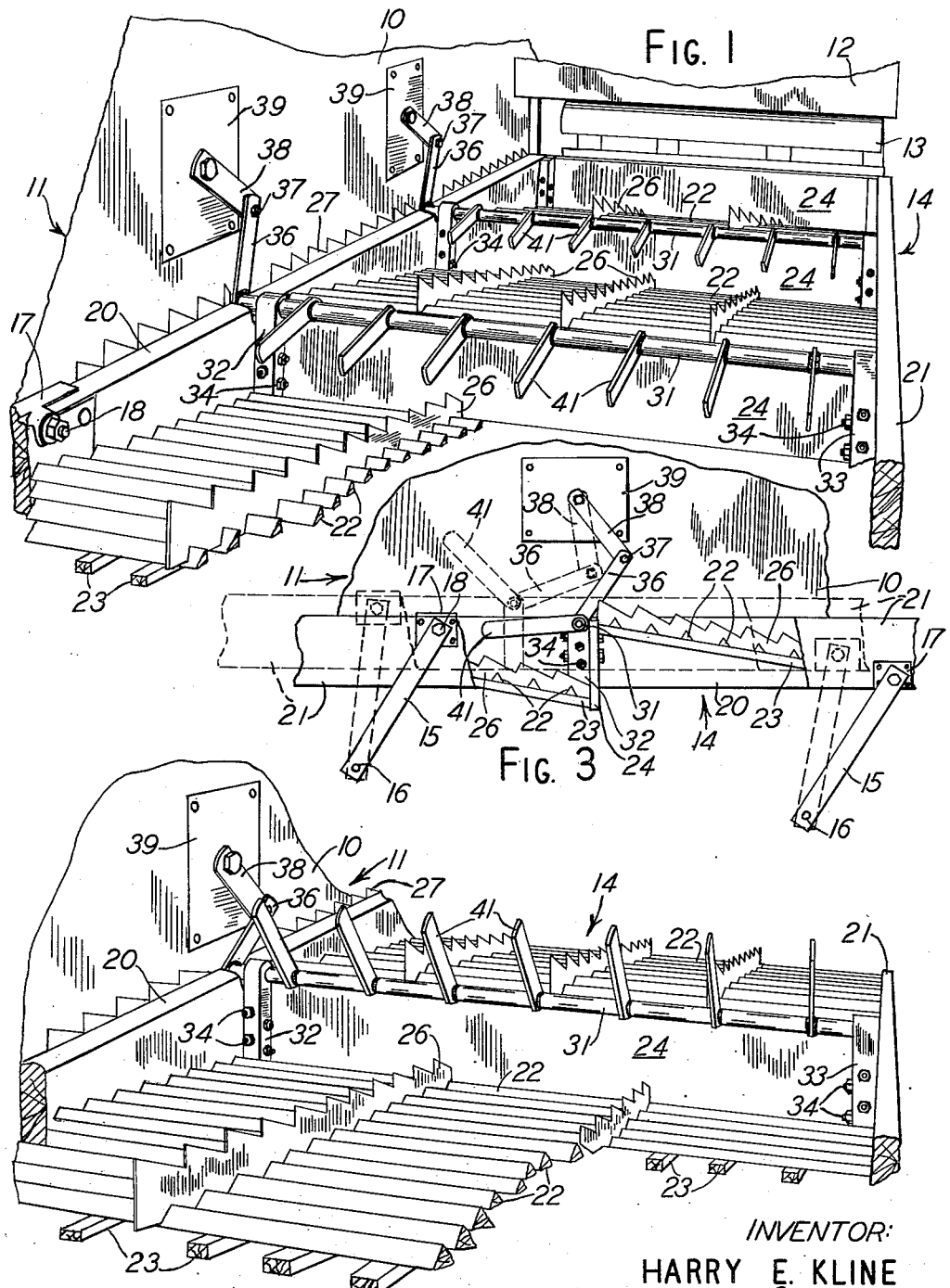

2,811,972
STRAW RACK HAVING VIBRATORS

Harry E. Kline, Racine, Wis., assignor to J. I. Case Company, Racine, Wis., a corporation of Wisconsin Application May 20, 1954, Serial No. 431,032

2 Claims. (Cl. 130—25)

This invention pertains to agricultural machines and a harvesting process. More particularly, it pertains to the separators for threshers or combines and the separating process.

In modern machinery for threshing crops it is common to employ a straw rack upon which the crop is vibrated by oscillation of the straw rack. In this operation, it is intended that the seeds or grain be separated from the stalks or straw in a most complete manner and at an efficient rate. However, it has been found that certain crops, such as rice, are more difficult to separate than other crops. Also, when harvesting in a dry field with a heavy harvest, the forward speed of the combine can be increased but then the rate of crop intake is also increased. Particularly with either of the above conditions it is desirable to improve the separating proficiency beyond that normally attained.

It is, therefore, an object of this invention to improve the separating operation, such as that in a thresher or combine.

A further object of this invention is to improve the separators of present day threshers or combines by a simple modification thereof without encountering extensive alterations or complete reconstruction of these machines.

Still another object of this invention is to improve the separating function of present day threshers or combines without requiring an additional power supply or a separate connection to the present power source of the machine.

Another object is to provide an improved process of separating grain from the straw in harvesting.

Other objects and advantages will become apparent upon reading the following description in conjunction with the accompanying drawings, wherein, Fig. 1 is a fragmentary perspective view of a machine containing a preferred embodiment of this invention.

Fig. 2 is a fragmentary perspective view of the machine shown in Fig. 1 but with the operating parts in a different position.

Fig. 3 is a fragmentary side elevational view of the machine shown in Fig. 1.

Similar reference numerals refer to similar parts throughout the three views.

The drawings show a fragment of the interior of a combine or thresher machine and particularly the separator section of the machine. The machine consists of a frame 11 of which is shown a vertically disposed side sheet 10. It should be understood that a similar sheet exists on the opposite side with a top sheet (not shown) connected between the two side sheets all forming an enclosed housing for the handling of the crop to be processed. The forward end of the machine is shown to contain a check flap or curtain 12 which depends from the top of the housing. Also, the usual threshing cylinder 13 is partly shown in Fig. 1 in front of the curtain 12. The crop to be processed is engaged by the cylinder 13 before the crop passes to the other parts of the combine separator which are described hereinafter. The cylinder loosens the grain from the straw of the crop and leaves a crop mixture.

A straw rack 14 is suitably horizontally mounted with the combine housing or frame 11 in the usual manner. In this construction, the straw rack is preferably mounted on four rocker arms, such as the two arms 15 shown in Fig. 3, with the arms pivotally attached at the lower end 16 to the combine and at the upper end to the straw rack. The rocker or pivot arms are generally positioned on the side of the straw rack with two arms at the front and two at the rear thereof. As shown in Fig. 1, the rear end arms are preferably attached to the straw rack through a mounting bracket 17, only one of which is shown, with the bracket 17 being attached to the straw rack. A transversely extending pivot bolt 18 connects the rocker arm to the bracket 17.

In this manner it will be seen that the straw rack is movably mounted in the frame, and, as indicated in Fig. 3, the rack is movable between the two positions shown. The actual movement of the rack is, therefore, in an arcuate path as the rocker arms are pivoted by a conventional power source (not shown) which oscillates the rack at a substantial rate. Since the operation of the straw rack is well known in the art, no further description thereof is necessary for a disclosure of this invention.

The straw rack is preferably constructed primarily of wood and consists of a pair of vertically disposed and horizontally spaced apart side boards 20 and 21. These boards are parallel and next to the sides of the housing or frame 11. Between the side boards is a plurality of transversely and longitudinally positioned and spaced apart members which form a grid. It is preferred that the grid be composed of a series of transversely disposed boards 22 which are attached to the side boards 20 and 21 to extend therebetween at various levels with each group of cross boards 22 forming an inclined tier as shown. For a reason hereinafter apparent, the boards 22 are triangular in cross section. Also, as shown in Fig. 3, inclined and longitudinally disposed boards 23 extend the length of each tier or section to support the cross boards. To complete the frame of the straw rack, it is usual to provide a vertically and transversely extending board 24 at the junction of the tiers and between the side boards 20 and 21. It will be seen that the boards are all arranged and spaced to provide for openings in the straw rack for grain to drop through. It is preferred that longitudinally disposed toothed plates 26 be spaced over the tops of the cross boards 22 at the same incline while toothed plates, such as the plate 27, be mounted on the side boards to project thereabove.

The foregoing describes a conventional and well known type of construction, therefore, no further description is necessary. The crop to be processed will be passed from the front end of the machine through the cylinder 13 and onto the straw rack 14. With the previously described structure, the rack 14 will be vibrated or oscillated in rapid back-and-forth strokes which will cause the crop to slide and bounce to move toward the rear of the rack. During the vibration the crop is, of course, shaken to separate the grain from the straw and cause the grain to fall through the openings or spacings in the rack. The fallen grain is recovered below the rack while the straw is disposed of at the rear end of the rack. The toothed plates 26 keep the crop distributed on the straw rack by minimizing the bunching of crop to one side of the rack, and also the teeth of the plates are shaped to assist in the movement of the crop along the rack.

As shown in Fig. 1, an agitator including a shaft 31 is pivotally mounted on the straw rack 14 to extend transverse thereto between the side boards 20 and 21. A second agitator having a similar shaft 31 is preferably located at the rear end of the first tier of the straw rack and approximately on the horizontal plane defined by the top of the incline of the tier. A pair of bearings 32 and 33 are attached inside the side boards 20 and 21, respectively, to pivotally mount the shaft 31 in the horizontal position shown. The bearings are secured to the straw rack by a plurality of bolts 34. Note that the drawing shows the shaft extending beyond the board 20 by having the board recessed on its top edge. The extended end of the shaft 31 has welded thereto a transversely projecting link 36 which is parallel to the side housing or frame of the machine. The link 36 extends upwardly from the shaft 31 to where it pivotally connects by a bolt or pin 37 to a second link 38. As further shown, the link 38 is pivotally mounted onto the side sheet 10 by means of a mounting plate 39 which is rigidly attached to the frame.

Referring again to the shaft 31, it will be seen that there is provided a plurality of fingers or bars 41 welded at spaced intervals along the shaft to project transversely therefrom. Thus, the fingers 41 are all arranged in a common plane on the shaft and they extend rearwardly therefrom to be vertically spaced above the lower end of the inclined tier. Further, the said plane of the fingers is at a predetermined angle with respect to the link 36. The second shaft 31 is similarly arranged.

With the foregoing description, it should be understood that the straw rack 14 oscillates between the solid line and the dotted line positions shown in Fig. 3. Of course, the bearing 32 and 33, being attached to the rack 14, will oscillate with the rack in its arcuate motion. In so moving, the shafts 31 are rotated through an acute angle, since the shafts move with the rack and they are connected to the frame 11 by the linkage described. Thus, the shafts 31 and the fingers 41, along with the rack 14, are moved between the two substantially extreme positions shown in Figs. 1 and 2. In Fig. 1, the rack is forward in the machine while in Fig. 2 the rack is rearward in the machine. As shown, the rearward position places the fingers higher with respect to the rack. The solid and the dotted positions of Fig. 3 are respectively similar to the positions of Fig. 1 and Fig. 2.

With this construction, the crop is moved from a tier of the straw rack and onto the shaft 31 and its fingers 41. The crop is then thrown upwardly by the fingers when the rack is rapidly moved rearwardly. Such action scatters and separates the crop which falls down onto the rack and the fingers to now permit the grain to fall through the rack as described. Thus the shafts and their fingers comprise a crop agitator or lifter while the links connected between the frame and the shafts are the actuators which impart the motion of the straw rack to the agitator.

The crop passing through the machine is subjected to a separating process which vibrates the crop and throws the crop to separate the grain from the straw. Without the agitator described above, the crop is not as completely separated as it is with the agitator, particularly since some crops, such as rice, tend to form a mat on the straw rack and the latter's action alone does not completely upset the mat to allow the grain to fall through.

Although a specific embodiment of this invention has been shown and described, the scope of the invention should be limited only by the appended claims.

I claim:

1. A crop separator, comprising in combination, a frame, rocker arms pivotally mounted on said frame, a straw rack attached to said rocker arms to oscillate in a generally fore-and-aft direction to cause crops to move rearwardly therealong, said straw rack having spaced longitudinal side members, and longitudinally-spaced transverse members secured at their ends to said longitudinal side members and substantially normal thereto, transversely-spaced longitudinal toothed plates extending intermediate said transverse members and provided with progressively rearwardly-rising tooth portions, transverse shafts positioned adjacent and parallel to said transverse members, bearing members for said shafts positioned at the corners formed by said longitudinal side members and said transverse members, means in said bearing members to secure the latter in said corners comprising fastening members passed normally through said bearing members and said longitudinal members, and fastening members passed normally through said bearing members and said transverse members, said shafts being provided with rearwardly-extending spaced-apart fingers, a first arm extending normally from one end of each of said shafts, and a second arm pivoted at one end thereof to each of said first arms, and pivotally anchored at the other end thereof to said frame.

2. A crop separator, comprising in combination, a frame, rocker arms pivotally mounted on said frame, a straw rack attached to said rocker arms to oscillate in a generally fore-and-aft direction to cause crops to move rearwardly therealong, said straw rack having spaced longitudinal side members, and longitudinally-spaced transverse members secured at their ends to said longitudinal side members and substantially normal thereto, transversely-spaced longitudinal toothed plates extending intermediate said transverse members and provided with progressively rearwardly-rising tooth portions, a transverse shaft positioned adjacent each of said transverse members, bearing members for said shaft positioned at the corners formed by said longitudinal side members and said transverse members, means in said bearing members to secure the latter in said corners comprising fastening members passed normally through said longitudinal members and fastening members passed normally through said transverse members, said shaft being provided with rearwardly-extending spaced-apart fingers, a first arm extending normally from one end of said shaft, and a second arm pivoted at one end thereof to said first arm, and pivotally anchored at the other end thereof to said frame.

References Cited in the file of this patent

UNITED STATES PATENTS

| | | |
|---|---|---|
| 375,486 | Grider | Dec. 27, 1887 |
| 519,609 | Lockhart | May 8, 1894 |
| 671,317 | Edison | Apr. 2, 1901 |
| 1,007,722 | Meyer | Nov. 7, 1911 |